United States Patent [19]

Nakano et al.

[11] Patent Number: 5,415,473
[45] Date of Patent: May 16, 1995

[54] CONE TYPE TWIN SCREW EXTRUDER HAVING GEAR REDUCTION SYSTEM

[75] Inventors: Hiromi Nakano; Toshio Uzihara; Toshio Yanagihara, all of Takasago; Masahiro Kanemitsu, Kaizuka, all of Japan

[73] Assignee: Kabushiki Kaisha Kobe Seiko Sho, Kobe, Japan

[21] Appl. No.: 152,711

[22] Filed: Nov. 16, 1993

[30] Foreign Application Priority Data

Nov. 16, 1992 [JP] Japan .................. 4-305623

[51] Int. Cl.6 .................. B29B 7/22; B01F 7/08
[52] U.S. Cl. .................. 366/83; 366/100; 74/665 H; 74/665 GC; 425/204
[58] Field of Search .......... 366/69, 79, 83–85, 366/89, 100, 96–99, 290, 292, 318; 425/204, 208, 209; 74/665 H, 665 GC, 665 GA, 665 GB; 475/332

[56] References Cited

U.S. PATENT DOCUMENTS

| | | | |
|---|---|---|---|
| 2,192,146 | 2/1940 | Nightenhelser et al. | 74/665 GB X |
| 2,466,934 | 4/1949 | Dellenbarger | |
| 3,325,864 | 6/1967 | Kohyama et al. | 366/83 |
| 3,605,188 | 9/1971 | McCormick et al. | 425/205 |
| 3,824,875 | 7/1974 | Willert et al. | 74/665 GA |
| 3,871,325 | 3/1975 | Raulerson | |
| 4,261,225 | 4/1981 | Zahradnik | |
| 4,269,085 | 5/1981 | Anders et al. | |
| 4,408,888 | 10/1983 | Hanslik | 366/83 |
| 4,514,164 | 4/1985 | Poulin | 366/83 X |
| 4,586,402 | 5/1986 | Schafer | 475/332 |
| 4,679,461 | 7/1987 | Mizuguchi et al. | 74/665 GA |
| 4,773,763 | 9/1988 | Weber | 366/83 |
| 4,786,180 | 11/1988 | Chszaniecki et al. | 366/83 |
| 4,796,487 | 1/1989 | De Bernardi | 74/665 GA |
| 5,232,280 | 8/1993 | Moriyama | 366/83 |

FOREIGN PATENT DOCUMENTS

| | | | |
|---|---|---|---|
| 13693 | 9/1910 | Denmark | 425/205 |
| 0472431 | 2/1992 | European Pat. Off. | |
| 2261511 | 7/1973 | Germany | 425/204 |
| 2748918 | 5/1979 | Germany | |
| 3612394 | 10/1987 | Germany | 475/332 |
| 3920422 | 1/1991 | Germany | 366/83 |
| 57-43052 | 3/1982 | Japan | 74/665 GB |
| 60-154030 | 8/1985 | Japan | 425/204 |
| 60-240430 | 11/1985 | Japan | 425/204 |
| 1-21787 | 6/1989 | Japan | |
| 30610 | 6/1989 | Japan | |
| 444470 | 3/1968 | Switzerland | 425/204 |

*Primary Examiner*—David A. Scherbel
*Assistant Examiner*—Charles Cooley
*Attorney, Agent, or Firm*—Oblon, Spivak, McClelland, Maier, & Neustadt

[57] ABSTRACT

In a cone type twin screw extruder, two rotor shafts are disposed in such a manner as to approach one another in the direction towards the leading edge, and to be rotatable. An interlocking device is provided on the side of the base portions of the rotor shafts for interlockingly connecting the rotor shafts with each other. The interlocking device has a pair of reduction gear devices disposed on the base portion sides of the rotor shafts, and the reduction gear is constituted of a spur gear train or a planetary gear train. High speed shafts of the reduction gears are interlockingly connected with bevel gear devices, and one shaft of the bevel gear device forms a connecting shaft projecting from the other bevel gear device side. Further, a pair of the connecting shafts are interlockingly connected with each other by a coupling device.

7 Claims, 2 Drawing Sheets

CONE TYPE TWIN SCREW EXTRUDER HAVING GEAR REDUCTION SYSTEM

BACKGROUND OF THE INVENTION

1. Field of the Invention

The present invention relates to a cone type twin screw extruder.

2. Description of the Related Art

There has been known such a bone type twin screw extruder as disclosed in Japanese Patent Publication No. HEI 1-30610 and Japan Utility Model Publication No. HEI 1-21787.

In the cone type twin screw extruder, two rotor shafts are disposed in such a manner as to taper to a smaller size toward their leading edge and to be rotatable, and an interlocking device is provided on the side of the base portion of the rotor shafts for interlockingly connecting the rotor shafts with each other. In the type described in Japanese Patent Publication No. HEI 1-30610, the above interlocking device comprises bevel gears which are provided on the base portions of the rotor shafts and are meshed with each other. Further, in the type described in Japan Utility Model Publication No. HEI-1-21787, the interlocking device comprises a pair of worm reduction gears provided on the base portions of the rotor shafts, and a belt transmitting device for interlocking connecting the worm shafts of the worm reduction gears.

The type of Japanese Patent Publication No. HEI 1-30610 is disadvantageous in that a pair of the bevel gears are large in size and cannot be machined without a special large sized gear cutting machine, resulting in increased cost.

Further, the type of Japan Utility Model Publication No. HEI 1-21787 is disadvantageous in that, since it uses the worm reduction devices, the power transmission efficiency is lowered to be about 70%, resulting in high energy loss.

SUMMARY OF THE INVENTION

Accordingly, an object of the invention is to provide a cone type twin screw extruder capable of using common small sized bevel gears and being excellent in power transmission efficiency.

To achieve the above object, the present invention provides the following means.

Namely, the cone type twin screw extruder of this invention has two rotor shafts disposed at an angle to each other such that their ends generally converge. These two rotor shafts are each connected to a reduction gear system comprising for example a planetary gear system or a spur gear train, for transmitting the drive from the high speed shafts to the low speed rotor shafts. These high speed shafts are connected to a connecting shaft through a gear system for transmitting drive through an angle (angle transmission gear system). Said system could comprise for example a series of cooperating bevel gears. In this way both rotor shafts are interconnected and may be driven by a single drive unit attached to either of the two high speed shafts.

By locating the angle transmission gear system on the high speed side of the reduction gear system in this way, it is possible to use, for example, small bevel gears which can be machined without the need for a special gear cutting machine.

In another aspect of the present invention the two sides of the cooperating system may be linked by means of connecting rods connected to said angle transmission gear systems and a coupling device joining said connecting rods. This coupling device could for example comprise a three-axis bevel gear system wherein two bevel gears of the system are connected to the connecting rods and the third bevel gear is connected to a shaft to which a drive unit may be connected for providing the drive to the rotor shafts.

According to the present invention, since the reduction gear system employed has a high power efficiency transmission such as a spur gear train or a planetary gear system, the power transmission efficiency is improved compared to the prior art systems in which a worm reduction gear was used. Further, in the present invention, since the angle transmission gear system is located on the high speed side of the reduction system, small bevel gears which do not require the use of a special cutting machine to manufacture may be used.

DETAILED DESCRIPTION OF THE PREFERRED EMBODIMENTS

Hereinafter, embodiments of the present invention will be described with reference to the drawings.

Figure 1:
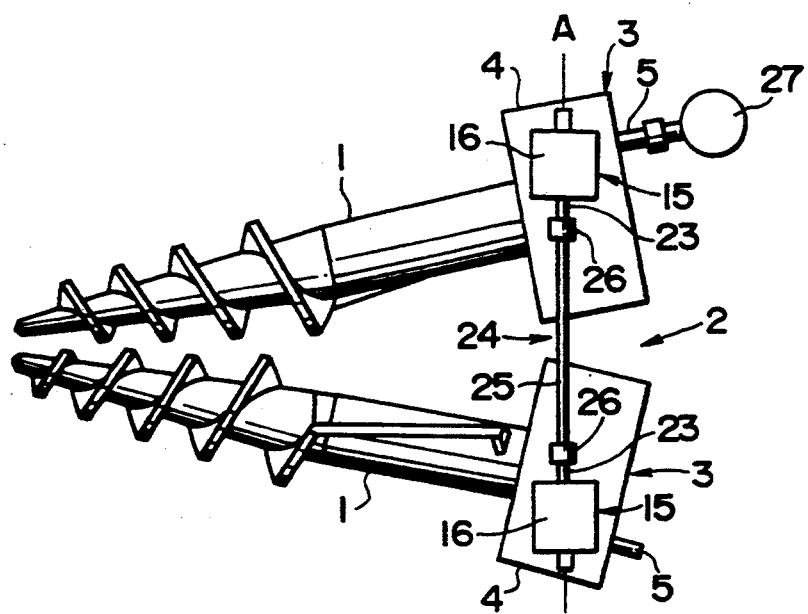
FIG. 1 is a plan view of a cone type twin screw extruder according to a first embodiment of the present invention.
Figure 2:
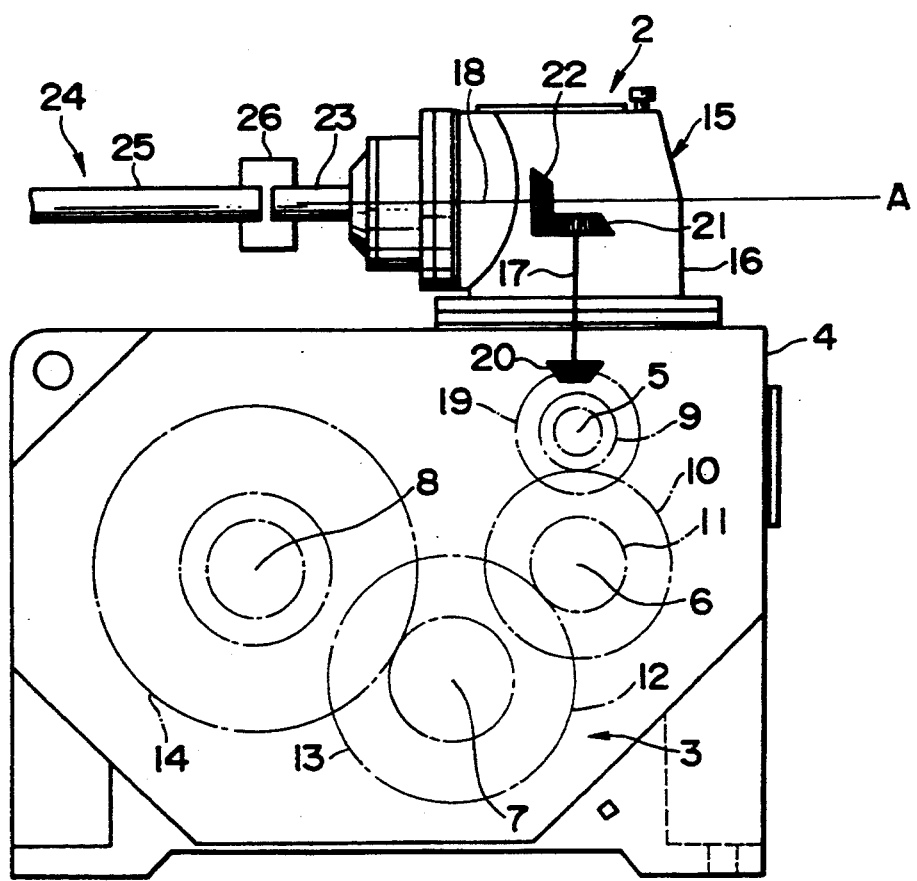
FIG. 2 is a side view of the extruder of the first embodiment of the present invention.

FIGS. 1 and 2 show a first embodiment of the present invention. In these figures, a cone type twin screw extruder has a pair or right and left rotor shafts 1 and 1 disposed in the horizontal direction. The pair of the right and left rotor shafts 1 and 1 are rotatable and disposed in such a manner that the center distance therebetween becomes smaller as one approaches the leading edge. An interlocking apparatus 2 for interlockingly connecting the two rotor shaft 1 and 1 with each other is provided on the side of the base portions of the rotor shafts 1 and 1.

The interlocking apparatus 2 has a pair of right and left reduction gears 3 and 3 respectively provided on the base portion sides of the rotor shafts 1 and 1. Each reduction gear 3 comprises a spur gear train.

Namely, the reduction gear 3 has a first gear box 4. An input shaft 5, a first intermediate shaft 6, a second intermediate shaft 7 and an output shaft 8 are rotatably supported in the first gear box 4 so as to be in parallel to each other. The output shaft 8 is integrated with the base portion of the rotor shaft 1. However, the output shaft 8 may instead be separated from the rotor shaft 1, and may be coaxially coupled with the base portion of the rotor shaft 1 through a coupling or the like. One end portion of the input shaft 5 projects outwardly of the first gear box 4 in the direction opposed to the rotor shaft 1.

In the first gear box 4, a first spur gear 9 is fixed on the input shaft 5. A second spur gear 10 and a third spur gear 11 are fixed on the first intermediate shaft 6, and the second spur gear 10 meshes with the first spur gear 9. A fourth spur gear 12 and a fifth spur gear 13 are fixed on the second intermediate shaft 7, and the fourth spur gear 12 meshes with the third spur gear 11. A sixth spur gear 14 meshing with the fifth spur gear 13 is fixed on the output shaft 8.

Thus, in the spur gear train of the above reduction gear 3, the gear ratio is set in such a manner that the input shaft 5 is rotated at a high speed and the output shaft 8 is rotated at a low speed.

A bevel gear device 15 is interlockingly connected with the input shaft 5 as the high speed shaft. The bevel gear device 15 has a second gear box 16 fixed on the upper surface of the first gear box 4. A vertical shaft 17 and a horizontal shaft 18, which are perpendicular to each other, are rotatably provided in the second gear box 16. The vertical shaft 17 is disposed so as to be perpendicular to the input shaft 5, and the lower end portion of the vertical shaft 17 projects within the first gear box 4.

A first bevel gear 19 is fixed on the input shaft 5, and a second bevel gear 20 meshing with the first bevel gear 19 is fixed on the lower end portion of the vertical shaft 17. Within the second gear box 16, a third bevel gear 21 is fixed on the upper end portion of the vertical shaft 17, and a fourth bevel gear 22 meshing with the third bevel gear 21 is fixed on the horizontal shaft 18.

Thus, the power of the input shaft 5 is transmitted to the horizontal shaft 18 through the above bevel gear train.

The one end portion of each horizontal shaft 18 forms a connecting shaft 23 projecting from the second gear box 16. Thus, the above connecting shafts 23 and 23 projecting from a pair of the right and left second gear boxes 16 and 16 are coaxially disposed, and are interlockingly connected with each other by a coupling device 24. The coupling device 24 comprises a rod 25 disposed between the ends of the connecting shafts 23 and 23, and couplings 26 and 26 for coupling the rod 25 with the connecting shafts 23 and 23.

Further, in this embodiment, of the input shafts 5 and 5 projecting from a pair of the right and left first gear boxes 4 and 4, one input shaft 5 is interlockingly connected with a motor shaft of a drive unit 27. Accordingly, the other input shaft 5 does not necessarily project from the first gear box 4.

According to the first embodiment of the present invention having the above construction, the power from the drive unit 27 is transmitted to one input shaft 5. It is transmitted to one rotor shaft 1 through the first and second intermediate shafts 6 and 7 and the output shaft 8. On the other hand, the power passes through one bevel gear device 15 and the coupling device 24, and is transmitted from the other bevel gear device 15 to the other input shaft 5. It is further transmitted to the other rotor shaft 1 through reduction gear 3. Thus, the pair of the right and left rotor shafts 1 and 1 are rotated in reverse directions and at the same speed.

In this embodiment, by use of the spur gears and bevel gears, it is possible to ensure power transmission efficiency of about 95%, which is excellent as compared with that using the worm reduction gear disclosed in Japanese Utility Model Publication No. HEI 1-21787 described above. Further, as compared with that using the vertical special motor described in Japanese Utility Model Publication No. HEI 1-21787, in this embodiment, it is possible to use a standard horizontal type as the motor of the drive unit and hence to simplify the layout of the frame. In addition, since the bevel gear is a standard small size type, it is possible to reduce the cost as compared with that using the large size bevel gear disclosed in Japanese Patent Publication No. HEI 1-30610 described above.

As a modification of the first embodiment, as shown by line A, one horizontal shaft 18 may project from the second gear box 16 to be connected to the drive unit 27.

Further, in this embodiment, the reduction gear 3 consists of a spur gear train; however, it may instead consist of a planetary gear train.

Figure 3:
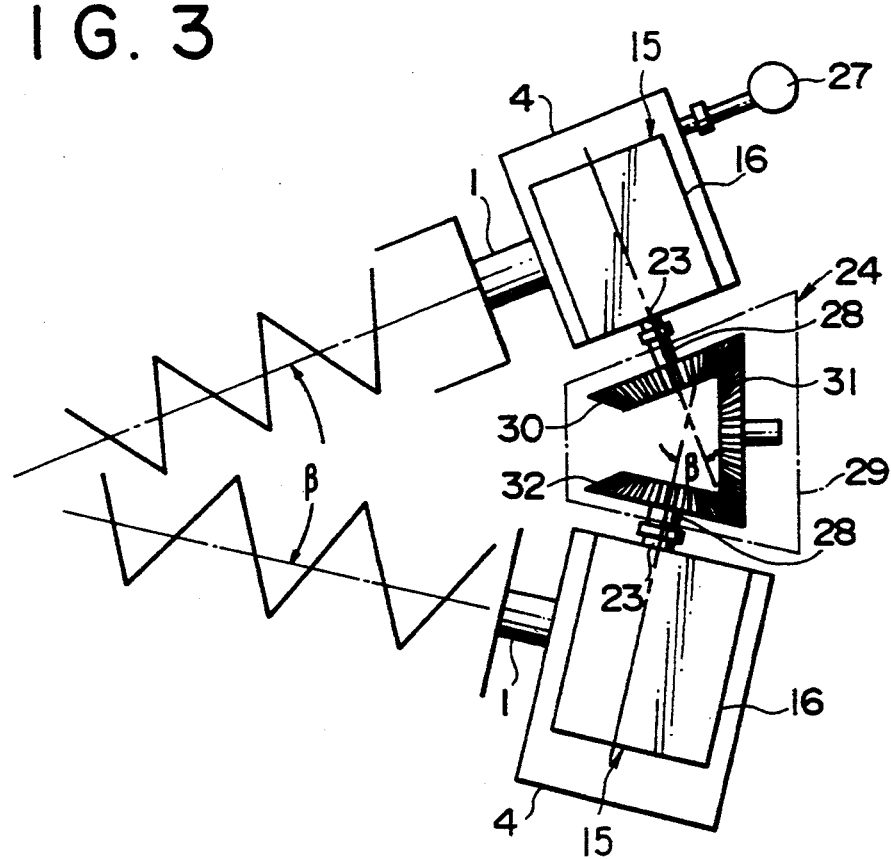
FIG. 3 is a plan view of a cone type twin screw extruder according to a second embodiment of the present invention.

FIG. 3 shows a second embodiment of the present invention, which is the same as the first embodiment except for the structures of a bevel gear device 15 and a coupling device 24.

Namely, according to the second embodiment, a pair or right and left connecting shafts 23 and 23 of the bevel gear devices 15 and 15 are disposed not to be coaxial with each other but to be perpendicular to the rotor shafts. Accordingly, a pair of right and left connecting shafts 23 and 23 are disposed to be crossed to each other, and are difficult to be connected to each other by a rod as in the first embodiment.

In the second embodiment, a coupling device is constituted of a three-axis bevel gear device, and two shafts 28 and 28 are respectively connected to the connecting shafts 23 and 23.

Namely, the three-axis bevel gear device has a third gear box 29 disposed between a pair of right and left second gear boxes 16 and 16. Fifth, sixth and seventh bevel gears 30, 31 and 32 are provided in the gear box 29 in such a manner as to be arranged substantially in a U-shape. The fifth and sixth bevel gears 30 and 31 are respectively meshed with each other, and the sixth and seventh bevel gears 31 and 32 are also meshed with each other. The fifth bevel gear 30 and the seventh bevel gear 32, which are opposed to each other, are disposed so as to be crossed to each other at a crossing angle $\beta$ which is the same as that of the two rotors 1 and 1. Further, the sixth bevel gear 31 is disposed on the wider side of the above crossing angle.

Thus, the shafts 28 and 28 of the fifth gear 30 and the seventh bevel gear 32 are disposed to be inclined like the connecting shafts 23 and 23 and at the same angle, and are respectively connected to the connecting shafts 23 and 23.

Figure 4:
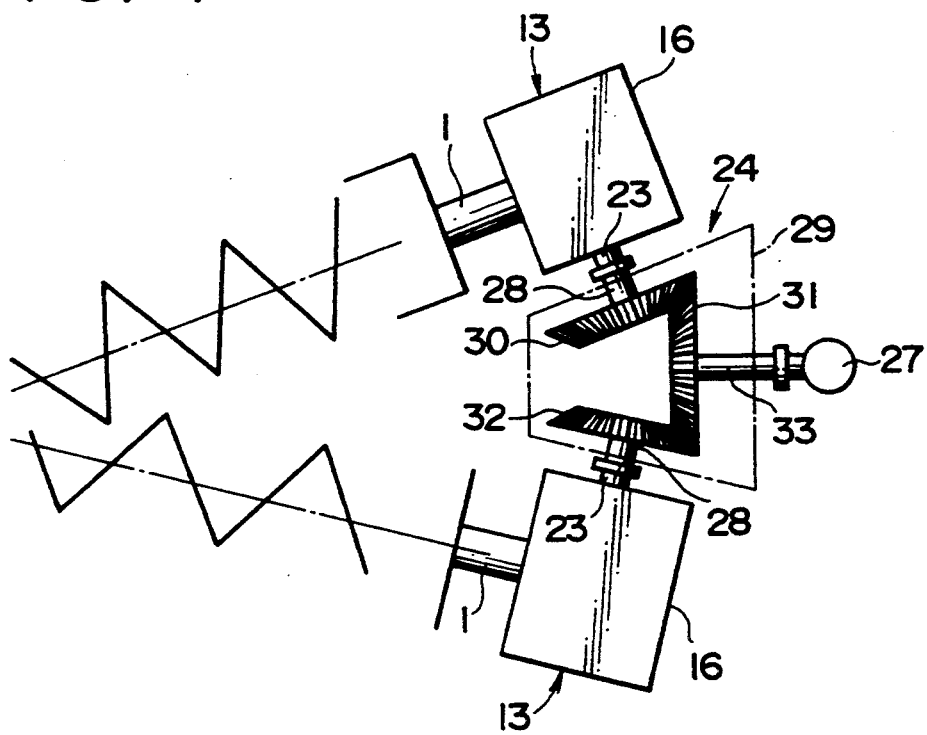
FIG. 4 is a plan view of a cone type twin screw extruder according to a third embodiment of the present invention.

FIG. 4 shows a third embodiment of the present invention, which is the same as the second embodiment except for the input manner from a drive unit 27.

Namely, in the third embodiment, the shaft of a sixth bevel gear 31 of a three-axis bevel gear device is taken as an input shaft 33. The input shaft 33 projects horizontally from a third gear box 29 opposite to a rotor shaft 1. The input shaft 33 is interlockingly connected with a motor of the drive unit 27.

Accordingly, in the third embodiment, as shown in the first and second embodiments, the input shaft 5 of the reduction gear 3 may not project outwardly of the first gear box 4.

Even in the second and third embodiments, the drive unit 27 may be connected to the horizontal shaft 18, and the reduction gear device may be constituted of the planetary gear.

In addition, the present invention is not limited to the above embodiments.

According to the present invention, since the reduction gear is constituted of a spur gear train or a planetary gear train, the power transmission efficiency is improved as compared with the prior art worm gear reduction gear. Further, in the present invention, since the bevel gear device is provided on the upstream side of the reduction gear, the bevel gear is used in a high speed range, and may be of a standard small sized type.

We claim:

1. A cone type twin screw type extruder comprising:
   two rotor shafts disposed such that ends of said rotor shafts generally converge;
   a gear wheel mounted on each of said rotor shafts;
   a reduction gear system connected to each of said rotor shafts through each of said gear wheels mounted on said rotor shafts;
   a high speed shaft connected to each of said reduction gear systems and arranged axially parallel to a respective one of said rotor shafts;
   a coupling device;
   bevel gear systems for transmitting drive through an angle, each of said bevel gear systems being connected between said coupling device and one of said high speed shafts; and
   a drive unit connected to one of said high speed shafts so that driving power is delivered to one of said rotor shafts via the reduction gear system connected to the high speed shaft having the drive unit connected thereto and the gear wheel mounted on said one of said rotor shafts, and so that driving power is delivered to the other of said rotor shafts via said bevel gear systems, said coupling device, the other reduction gear system, and the gear wheel mounted on said other of said rotor shafts.

2. The cone type twin screw type extruder of claim 1 wherein said coupling device comprises a rod coupled to said bevel gear systems by couplings.

3. The extruder of claim 2 wherein said bevel gear systems each comprise:
   a first bevel gear mounted on said high speed shaft;
   a connecting shaft coupled to said rod of said coupling device by one of said couplings;
   a second bevel gear mounted on said connecting shaft;
   third and fourth bevel gears respectively meshing with said first and second bevel gears; and
   a link shaft mounted for rotation about an axis substantially perpendicular to axes of said high speed shafts, wherein said third and fourth bevel gears are mounted on said link shaft.

4. A cone type twin screw type extruder comprising:
   two rotor shafts disposed such that ends of said rotor shafts generally converge;
   a gear wheel mounted on each of said rotor shafts;
   a reduction gear system connected to each of said rotor shafts through each of said gear wheels mounted on said rotor shafts;
   a high speed shaft connected to each of said reduction gear systems and arranged axially parallel to a respective one of said rotor shafts;
   connecting rods;
   a drive unit;
   gear systems for transmitting drive through an angle, each of said gear systems being connected between one of said connecting rods and one of said high speed shafts; and
   a three axis bevel gear system, wherein two bevel gears of said three axis bevel gear system are each connected to a respective one of said connecting rods and wherein a third bevel gear of said three axis bevel gear system meshes with said other two bevel gears and is connected to said drive unit so that driving power is delivered to both of said rotor shafts via said bevel gear system, said connecting rods, said gear systems, said high speed shafts, said reduction gear systems and said gear wheels mounted on said rotor shafts.

5. The cone type twin screw type extruder of claim 1 or 4 wherein said gear systems for transmitting drive through an angle comprises a series of cooperating bevel gears.

6. The cone type twin screw type extruder of claim 1 or 4 wherein each said reduction gear system consists of a spur gear train connected between one of said high speed shafts and one of said gear wheels.

7. A cone type twin screw type extruder comprising:
   two rotor shafts disposed such that ends of said rotor shafts generally converge;
   a gear wheel mounted on each of said rotor shafts;
   a reduction gear system connected to each of said rotor shafts through each of said gear wheels mounted on said rotor shafts;
   a high speed shaft connected to each of said reduction gear systems and arranged axially parallel to a respective one of said rotor shafts;
   connecting rods;
   a drive unit connected to one of said high speed shafts;
   gear systems for transmitting drive through an angle, each of said gear systems being connected between one of said high speed shafts and one of said connecting rods; and
   a three axis bevel gear system, wherein two bevel gears of said three axis bevel gear system are each connected to a respective one of said connecting rods and wherein a third bevel gear of said three axis bevel gear system meshes with said other two bevel gears, so that driving power is delivered to one of said rotor shafts via the reduction gear system connected to the high speed shaft having the drive unit connected thereto and the gear wheel mounted on the one of the rotor shafts, and so that the driving power is delivered to the other of said rotor shafts via said gear systems, said connecting rods, said three axis bevel gear system, the other reduction gear system, and the gear wheel mounted on the other of the rotor shafts.

* * * * *